United States Patent
Pain et al.

(10) Patent No.: US 6,373,050 B1
(45) Date of Patent: Apr. 16, 2002

(54) FOCAL PLANE INFRARED READOUT CIRCUIT WITH AUTOMATIC BACKGROUND SUPPRESSION

(75) Inventors: Bedabrata Pain, Los Angeles; Guang Yang, West Covina; Chao Sun, San Gabriel; Timothy J. Shaw, Pasadena; Chris J. Wrigley, La Crescenta, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/414,976

(22) Filed: Oct. 7, 1999

Related U.S. Application Data (60) Provisional application No. 60/103,361, filed on Oct. 7, 1998.

(51) Int. Cl.$^7$ ................................................. G01V 5/04
(52) U.S. Cl. ..................... 250/261; 250/252.1; 250/330
(58) Field of Search ............................. 250/252.1, 261, 250/262, 263, 208.4, 208.1, 206, 330, 334

(56) References Cited

U.S. PATENT DOCUMENTS

| | | | |
|---|---|---|---|
| 5,886,659 A | 3/1999 | Pain et al. ................... 341/155 |
| 5,909,026 A | 6/1999 | Zhou et al. ............... 250/208.1 |
| 5,929,800 A | 7/1999 | Zhou et al. ................... 341/161 |
| 5,949,483 A | 9/1999 | Fossum et al. ............. 348/303 |
| 6,121,613 A | * 9/2000 | Tew ........................... 250/334 |

* cited by examiner

Primary Examiner—Hung Xuan Dang
(74) Attorney, Agent, or Firm—Fish & Richardson P.C.

(57) ABSTRACT

A circuit for reading out a signal from an infrared detector includes a current-mode background-signal subtracting circuit having a current memory which can be enabled to sample and store a dark level signal from the infrared detector during a calibration phase. The signal stored by the current memory is subtracted from a signal received from the infrared detector during an imaging phase. The circuit also includes a buffered direct injection input circuit and a differential voltage readout section. By performing most of the background signal estimation and subtraction in a current mode, a low gain can be provided by the buffered direct injection input circuit to keep the gain of the background signal relatively small, while a higher gain is provided by the differential voltage readout circuit. An array of such readout circuits can be used in an imager having an array of infrared detectors. The readout circuits can provide a high effective handling capacity.

35 Claims, 5 Drawing Sheets

FOCAL PLANE INFRARED READOUT CIRCUIT WITH AUTOMATIC BACKGROUND SUPPRESSION

CROSS REFERENCE TO RELATED APPLICATION

This application claims the benefit of U.S. Provisional Application No. 60/103,361, filed on Oct. 7, 1998.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND

The present disclosure relates, in general, to image sensors and, in particular, to focal plane infrared readout circuits with background suppression.

In general, image sensors find applications in a wide variety of fields, including machine vision, robotics, guidance and navigation, automotive applications, and consumer products. Imaging systems that operate in the very long infrared (IR) wavelength region—in other words, in the range of about 12–18 microns ($\mu$m)—are required for a number of space-based applications such as monitoring global atmospheric temperature profiles, relative humidity profiles, cloud characteristics and the distribution of minor constituents in the atmosphere. Such IR imaging systems also can be used for fire prevention and control, for enhanced visibility in foggy conditions, and for spectroscopic applications.

Imaging in the very long infrared wavelength region presents several design problems which primarily are a result of the presence of relatively large background signal levels. Large signal handling capacity and very small signal-to-background-contrast impose stringent requirements on the design of focal plane infrared readout circuits. A large background signal can limit the dynamic range of the imager. Furthermore, in some applications, the signal of interest may be several orders of magnitude smaller than the background signal.

For example, in one system known as the Integrated Multispectral Atmospheric Sounder (IMAS), an IR spectrometer subsystem is intended to collect data in the range of 3.74 $\mu$m to about 15.4 $\mu$m. Spectral data is acquired through use of a grating spectrometer and cooled quantum-well IR photodetector (QWIP) arrays. Such detectors exhibit uniform response and low 1/f noise, are reproducible at low cost, and can be manufactured in two-dimensional arrays.

To achieve high injection efficiency, however, the readout circuit for the QWIP array should have a low input impedance compared to the impedance of the photodetectors. The IMAS system has a very large background level. At its operation temperature of about 55 degrees kelvin (°K), the leakage current of the QWIPs is about 100 to 300 nano-amperes (nA), and the scene background photon-induced dark current is approximately 3.5 nA. For an integration time of 1.4 milliseconds (msec), the total dark level is on the order of $10^9$ electrons per pixel. Therefore, the readout circuit must have a large signal handling capacity. In addition, as a result of the high detector leakage, the noise limit is governed by the shot noise in the detector dark current. For a QWIP with a photoconductive gain of approximately 0.1, the noise limit is about 10 pico-amperes (pA). In other words, the focal plane contrast, defined as the ratio of the minimum detectable signal to the background level, is very small. The readout circuit for such a system should be sufficiently accurate and sensitive to provide a differential output signal that may be as much as 85 decibels (dB) below the dark or background level.

Known techniques for handling high dynamic range include the use of switched capacitor integration, the use of gate modulated input (GMI) readout circuits, and the use of multiple gain stages. Switched capacitor integration techniques, however, require a high speed input circuit, thus limiting their feasibility. Additionally, the noise performance of switched capacitor integration techniques tends to be relatively poor. Similarly, GMI readout circuits suffer from poor noise performance because of biasing requirements and current attenuation required for obtaining a high dynamic range. The use of multiple gain stages requires prior knowledge of the dynamic range of the scene to be imaged and suffers from noise limitations in high contrast, high background environments.

SUMMARY

In general, according to one aspect, a circuit for reading out a signal from an infrared detector includes a current-mode background-signal subtracting circuit having a current memory which can be enabled to sample and store a dark level signal from the infrared detector during a calibration phase. The signal stored by the current memory is subtracted from a signal received from the infrared detector during an imaging phase.

The readout circuit can also include a buffered direct injection input circuit and a differential voltage readout section. By performing most of the background signal estimation and subtraction in a current mode, a low gain can be provided by the buffered direct injection input circuit to keep the gain of the background signal relatively small, while a higher gain is provided by the differential voltage readout circuit.

According to another aspect, an infrared imager includes an infrared detector and a readout circuit. The imager can include an array of infrared detectors with a corresponding array of readout circuits. The readout circuit can be used with various types of detectors, including detectors that are sensitive to radiation in a range of about 12–18 microns. In one implementation, the imager includes one or more quantum well infrared photodetectors.

Various implementations include one or more of the following features. Techniques can be provided in the current memory to reduce the switch feedthrough voltage. For example, the current memory can include multiple capacitively-coupled current loops.

The readout circuit can include an integration capacitor for converting a current signal to a corresponding voltage signal that then can be sampled and stored in the differential voltage readout section. The integration capacitor can be reset.

In yet another aspect, a method of reading out a signal sensed by an infrared detector includes storing a dark level signal received from the infrared detector in a current memory circuit during a calibration phase. The signal stored in the current memory circuit is subtracted from a signal received from the infrared detector during an imaging phase. An output signal corresponding to the difference between the dark level signal received from the detector during the calibration phase and the signal received from the detector during the imaging phase can be provided.

In a related aspect, a method of reading out signals sensed by an infrared detector includes storing a dark level signal received from the infrared detector in a current memory circuit during a calibration phase. A first current signal that represents the difference between the signal stored in the current memory circuit and a signal received from the infrared detector during a first sensing period is provided. A second current signal that represents the difference between the signal stored in the current memory circuit and a signal received from the infrared detector during a second sensing period also is provided. Then, a differential voltage output signal corresponding to a difference between the first and second current signals is provided.

In some implementations, the detector is exposed to infrared radiation during the second sensing period. The first and second current signals can be converted, respectively, to first and second voltage signals. The act of converting can include integrating current signals on an integration capacitor, sampling voltages on the integration capacitor, and holding the sampled voltages on first and second capacitors, respectively.

Various implementations include one or more of the following advantages. By performing most of the background signal estimation and subtraction in a current mode, the readout circuit can operate with variable gains. In particular, a low gain can be provided by the buffered direct injection input circuit to keep the gain of the background signal relatively small, while a higher gain is provided by the differential voltage readout circuit. Therefore, the readout circuit can provide a high dynamic range and low noise performance, Furthermore, the readout circuit can be operated with low power consumption. In addition, the readout circuit can exhibit high linearity. The accurate subtraction of the background signal can enable a high effective handling capacity of more than $5 \times 10^9$ charges/pixel. At low operating temperatures, for example, around 55° K, the circuit can exhibit a very small current memory leakage as well as minimal variation in the current in the memory circuit.

Other features and advantages will be readily apparent from the following description, accompanying drawings and the claims.

DETAILED DESCRIPTION

Figure 1:
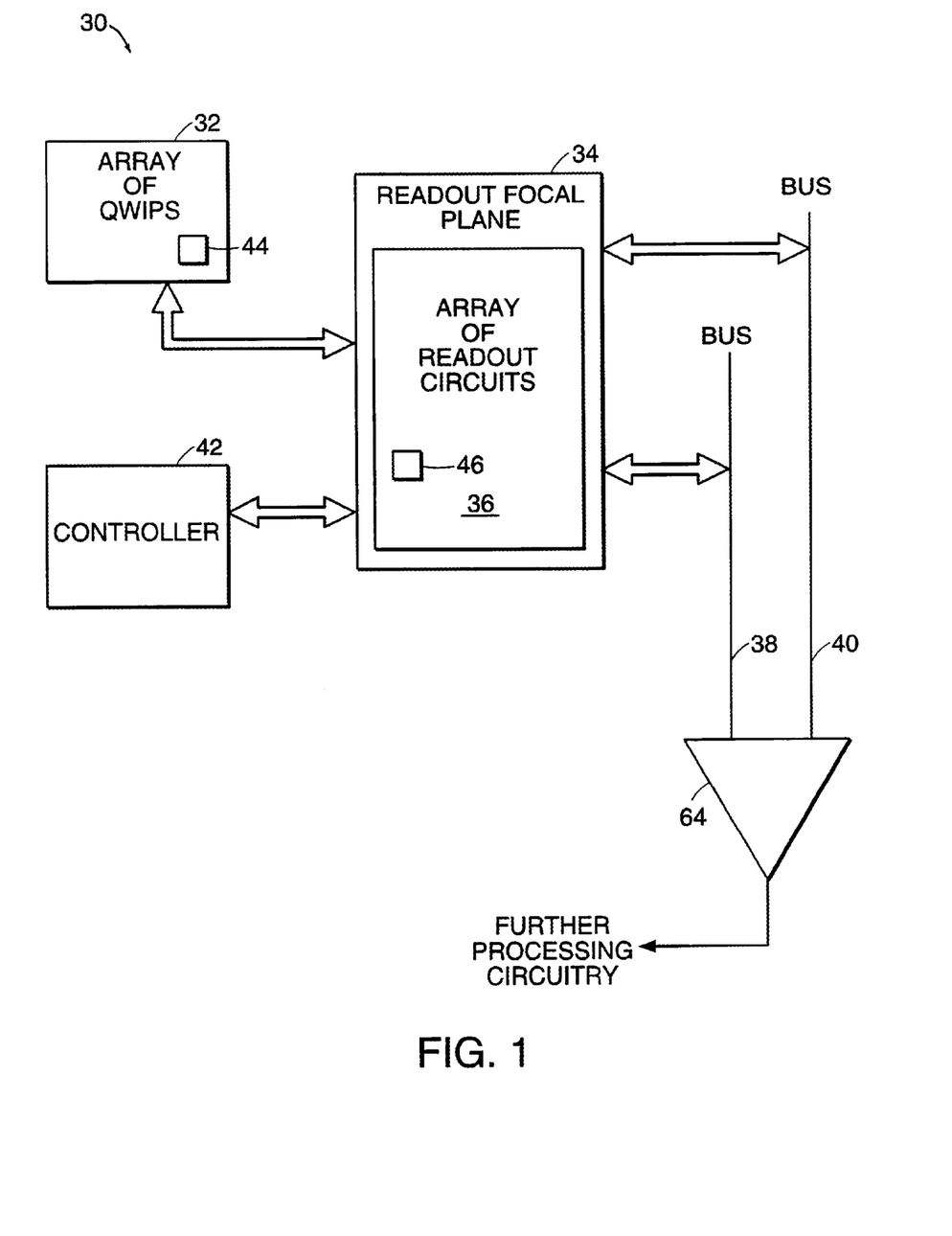
FIG. 1 is a block diagram of part of an infrared imager according to the invention.

FIG. 1 shows an exemplary IR imager 30 that includes a two-dimensional array 32 of infrared radiation detectors 44 and a readout focal plane 34. The readout focal plane 34 includes an array 36 of readout circuits that provide differential voltage outputs corresponding to the signals sensed by the photodetectors. The differential outputs of the readout circuits are provided to a pair of buses 38, 40 which can provide the differential voltage signals, for example, to a differential amplifier 64 or other circuitry (not shown) for further processing. The array of readout circuits 36 can be fabricated on a single integrated circuit.

The imager 30 also includes a controller 42 which provides timing and control signals to enable reading out of signals sensed by the detectors 44.

In the illustrated implementation, the array 32 of infrared radiation detectors is a 2×130 array of quantum well infrared photodetectors (QWIPs) 44. The particular readout focal plane 34 shown in FIG. 1 includes a bilinear array of 2×132 readout circuits. In general, the size of the arrays can vary depending on the particular implementation. The QWIPs, which can be fabricated, for example, on a GaAs/AlGaAs superlattice and use slotted grating to couple the optical signals, can detect radiation in the range of about 14.67 to 15.4 microns ($\mu$m). Other types of infrared photodetectors may be suitable in various implementations and can be used to detect infrared radiation in the range of about 12–18 $\mu$m.

Figure 2:
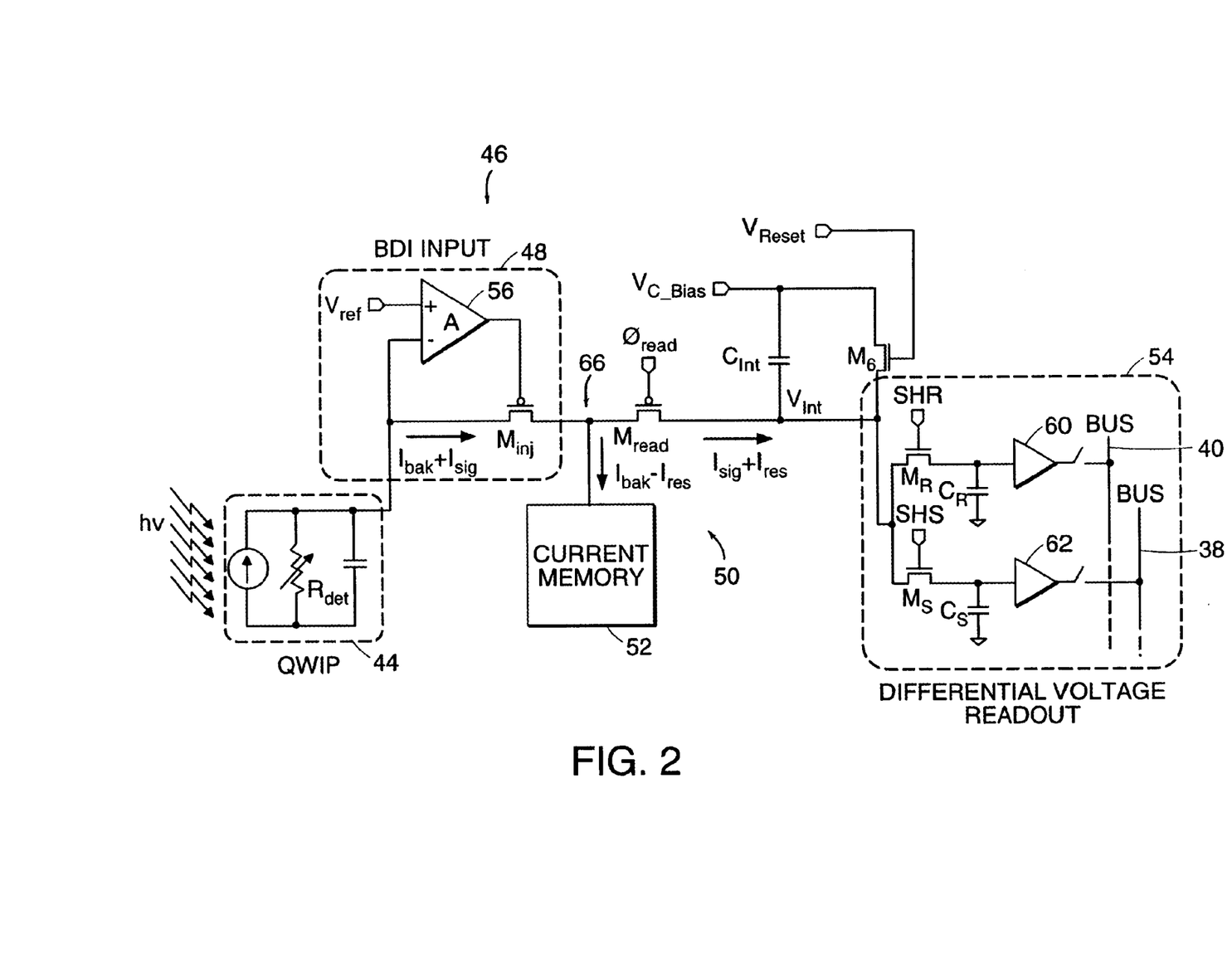
FIG. 2 is a schematic circuit diagram illustrating a readout circuit according to the invention.

As shown in FIG. 2, a unit cell readout circuit 46 includes a buffered direct injection (BDI) input circuit 48, a current-mode background-signal subtracting circuit 50, and a double-sampled differential voltage circuit 54. In FIG. 2, the QWIP 44 is represented schematically by a current source in parallel with a variable resistor and a capacitor.

The BDI input circuit 48 provides the required bias stability for the QWIP 44 and a high input impedance to enable high quantum efficiency. The BDI input circuit 48 uses an operational amplifier 56 with active feedback provided through an injection transistor $M_{inj}$. A reference voltage $V_{ref}$ is provided to the positive input of the operational amplifier 56, and the output of the QWIP 44 is provided to the negative input of the operational amplifier.

The current-mode background-signal subtracting circuit 50 includes a current memory circuit 52, and an isolation switch, implemented as a field effect transistor (FET) $M_{read}$.

Figures 3A, 3B:
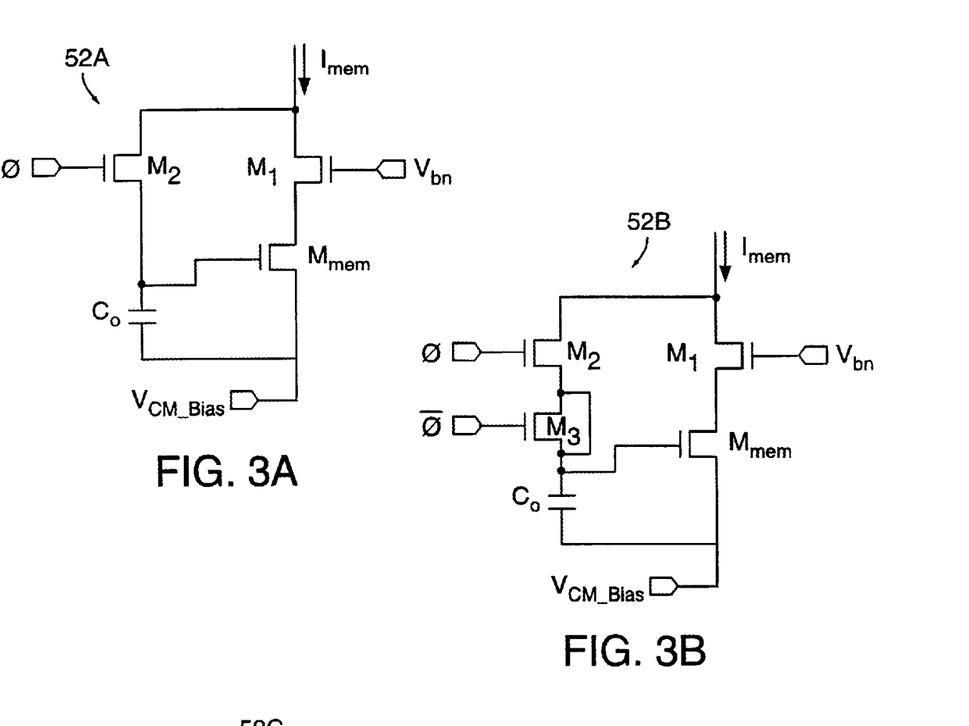
FIGS. 3A, 3B and 3C show various embodiments of a current memory circuit for use in the readout circuit of FIG. 2.

In one implementation, a single stage current memory circuit 52A is used as shown in FIG. 3A. A clock signal $\phi_1$ is applied to the gate of the transistor $M_2$. A bias voltage $V_{bn}$ is applied to the gate of transistor $M_1$, and a bias voltage $V_{CM\_Bias}$ is applied to the source of the memory transistor $M_{mem}$.

In general, the current memory 52A operates as follows. When the clock signal $\phi_1$ goes high, the gate voltage of the memory transistor $M_{mem}$ charges up to a value such that the current $I_{mem}$ flowing through the transistor $M_{mem}$ is approximately equal to the current flowing into its drain. When the clock signal $\phi_1$ goes low, the gate voltage of the memory transistor $M_{mem}$ is sampled and held by the capacitor $C_0$. Thus, the memory circuit 52A can temporarily store and provide a current corresponding to the current $I_{mem}$.

Two techniques can be used to reduce the effects of switch feedthrough in the current memory circuit of FIG. 3A. First, as shown in FIG. 3B, a second switching transistor $M_3$ can be added to the form a memory circuit 52B. The inverse of the clock signal $\phi_1$ is applied to the gate of the transistor $M_3$, which has its source and drain electrically connected together. Preferably, the gate size of the transistor $M_2$ is about twice the gate size of the transistor $M_3$. The second transistor $M_3$ can be used to compensate for the channel charge under the transistor $M_2$ when the latter transistor is shut off.

Figure 3C:
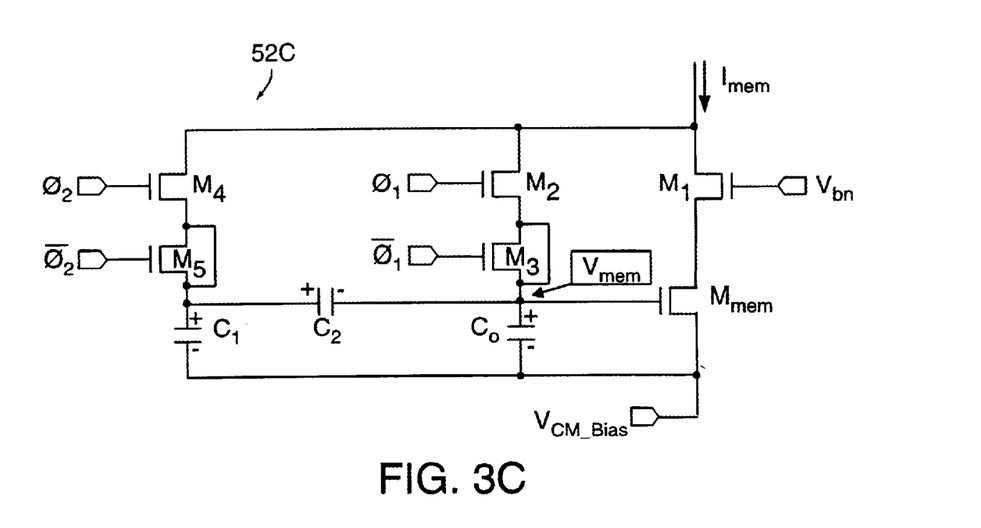

Second, as shown in FIG. 3C, a capacitively-coupled second memorization loop can be added to form a memory circuit 52C. The second memorization loop, which includes transistors $M_4$, $M_5$ and capacitors $C_1$, $C_2$, reduces the switch feedthrough voltage by the ratio of $C_1$ to $C_2$. Exemplary values of $C_0$, $C_1$ and $C_2$ are 2 picofarads (pF), 2 pF and 20 femtofarads (fF), respectively, so that the switch feedthrough voltage is reduced by a factor of about one hundred. For many applications, that is sufficient to make any error due to switch feedthrough insignificant with respect to the operation of the readout circuit 46.

Figure 5:
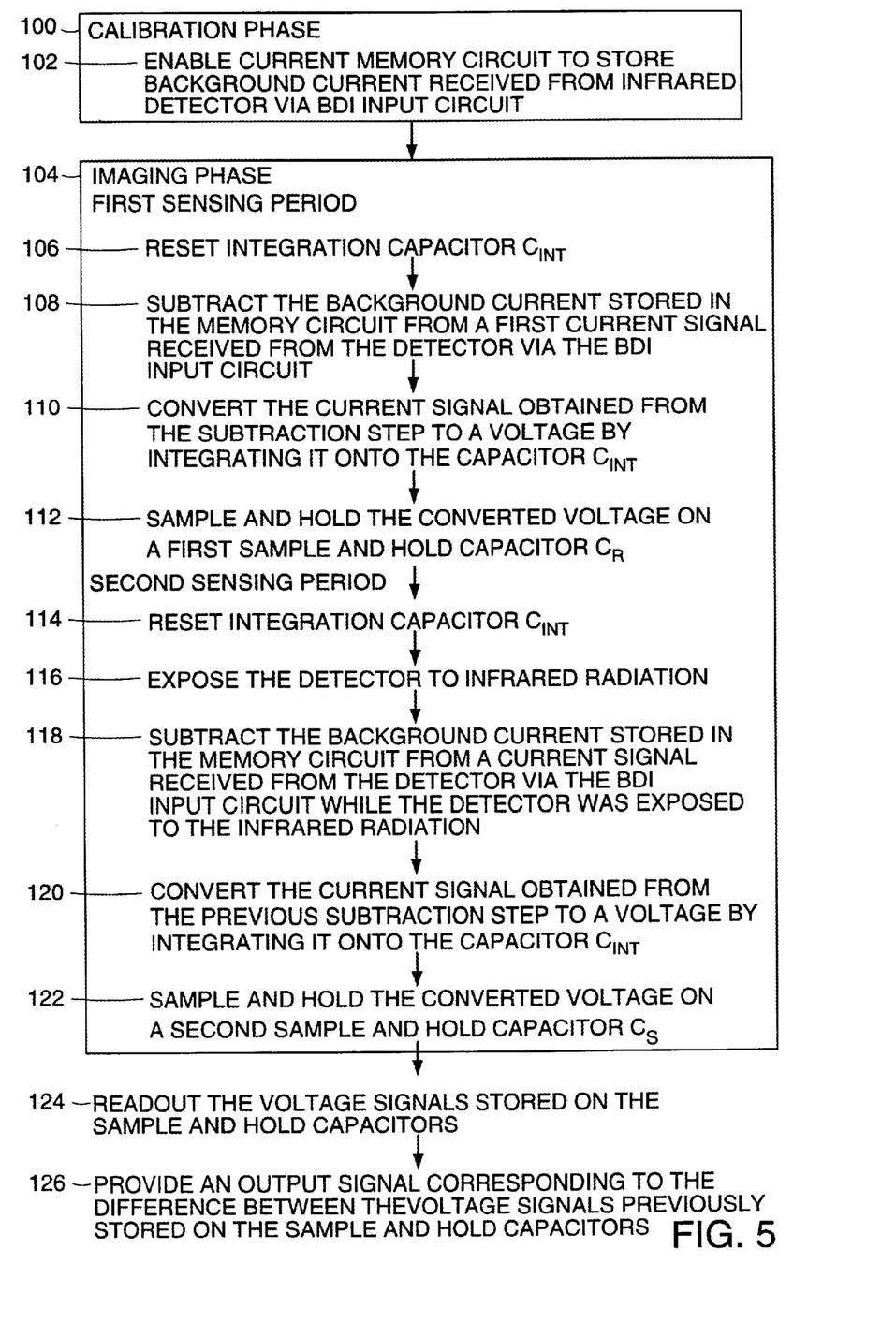
FIG. 5 is a flow chart showing steps in a method according to the invention.

Operation of the readout circuit 46 is now explained. The circuit 46 is designed to perform dark level suppression automatically by sampling and holding the dark level during a calibration phase (see 100 in FIG. 5), and subsequently subtracting the dark level from signals sensed during an imaging phase (see 104 in FIG. 5). Most of the background estimation and subtraction is carried out in a current mode to allow the readout circuit 46 to operate with variable gains. In particular, a low gain can be provided by the amplifier 56 in the BDI input circuit 48 to keep the gain of the background signal relatively small, while a higher gain is provided by amplifiers 60, 62 for the differential voltage readout.

Figure 4:
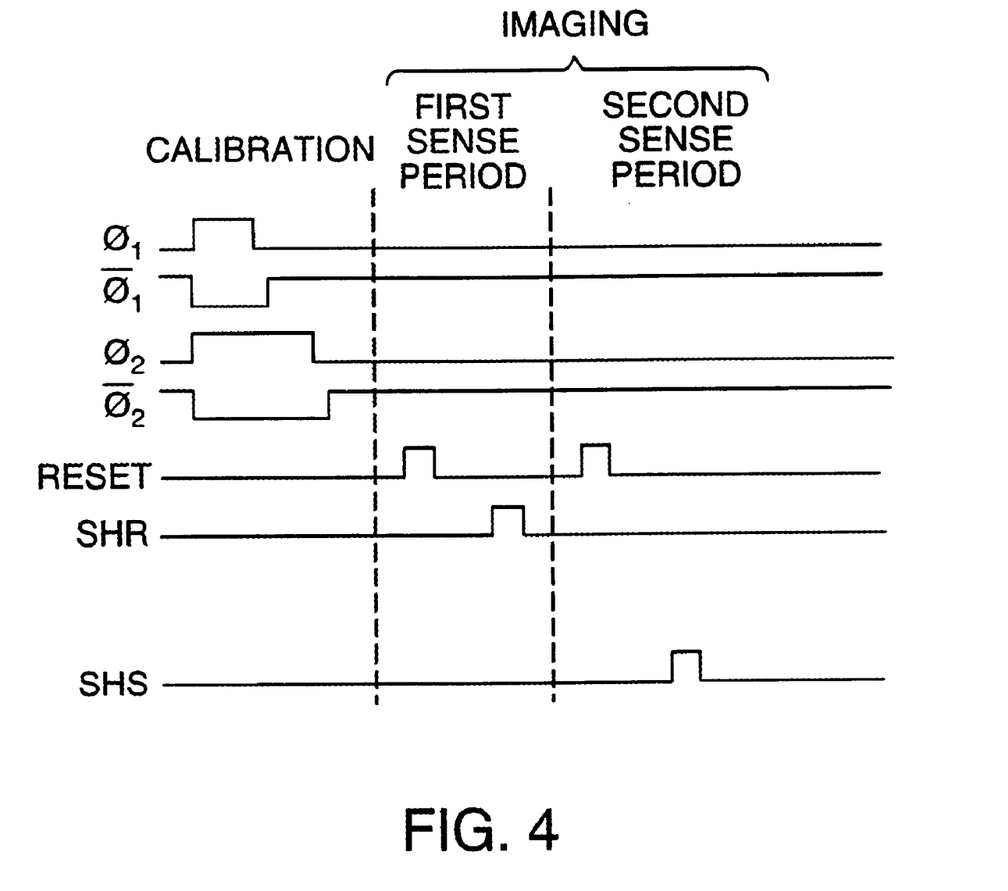
FIG. 4 is a timing diagram of various signals in the readout circuit of FIGS. 2 and 3A–3C.

During the calibration phase, the QWIP 44 is not exposed to the infrared signal of interest, and only a dark current $I_{bak}$ flows through the QWIP. The dark current $I_{bak}$ may include detector dark current as well as current caused by scene and/or instrument background signals. During the calibration phase, the memory circuit 52 is enabled to store a voltage $V_{mem}$ (see FIG. 3C) based on the background current $I_{bak}$ (step 102). Timing for the clock signals $\phi_1$ and $\phi_2$ is illustrated in FIG. 4. In some applications, the detector dark current is the dominant component of the background current and may be on the order of about 100–300 nanoamperes (nA).

Ideally, the current $I_{mem}$ stored in the memory transistor $M_{mem}$ should be equal to the total dark current $I_{bak}$. However, in some cases the two currents are not equal, giving rise to a small offset current $I_{res}$, where $I_{res}=I_{bak}-I_{mem}$.

Following the calibration phase, the imaging phase is performed. The imaging phase includes two sensing periods so that a differential output can be provided. Initially, the voltage across the integration capacitor $C_{Int}$ is reset by turning on a transistor $M_6$ in parallel with the integration capacitor (step 106). The transistor $M_6$ can be turned on using a reset voltage $V_{Reset}$ applied to its gate. During the first sensing period, the detector 44 still is not exposed to the infrared signal of interest, although it may be exposed to other background radiation. The current flowing through the isolation transistor $M_{read}$ represents the difference between the current flowing from the detector 44 through the BDI input circuit 48 and the current from the memory circuit 52. In other words, the background current $I_{mem}$ stored in the memory circuit 52 is subtracted from the current signal received from the detector and BDI input circuit during the first sensing period (108).

Next, the current flowing through the isolation transistor is converted to a voltage by integrating the signal on an integration capacitor $C_{Int}$ (step 110) and then sampling and holding the voltage onto one of the sample and hold capacitors $C_R$ in the differential voltage circuit 54 (step 112). The voltage stored on the integration capacitor $C_{Int}$ can be sampled by turning on the transistor $M_R$ using a gate signal SHR. Timing of the reset and SHR signals is illustrated in FIG. 4.

If, for example, the detector 44 is not exposed to any additional background radiation during the first sensing period, then the current flowing through the isolation transistor $M_{read}$ will be equal to the offset current $I_{res}(=I_{bak}-I_{mem})$. When the voltage on the integration capacitor subsequently is sampled, a voltage corresponding to the offset current $I_{res}$ would be stored on the capacitor $C_R$.

Following the first sensing period, the voltage across the integration capacitor $C_{Int}$ is reset again by turning on the transistor $M_6$ (step 114).

During the second sensing period, the current flowing in the QWIP 44 is increased, for example, as a result of infrared radiation to which the QWIP is exposed (step 116). Thus, the current passing through the injection transistor $M_{inj}$ is equal to $I_{bak}+I_{sig}$. The current $I_{mem}$ stored by the memory circuit 52 is subtracted from the current signal ($I_{bak}+I_{sig}$) received from the QWIP 44 via the BDI input circuit 48 (step 118). Therefore, the current appearing on the right-hand side of the isolation transistor $M_{read}$ is the difference between the current passing through the injection transistor $M_{inj}$, in other words $I_{bak}+I_{sig}$, and the current flowing from the memory circuit 52, in other words $I_{mem}$ ($=I_{bak}-I_{res}$). Specifically, the current appearing on the right-hand side of the isolation transistor $M_{read}$ equals $I_{sig}+I_{res}$. That current is converted to a voltage signal by integrating the current on the integration capacitor $C_{Int}$ (step 120) and then sampling and holding the voltage onto a second one of the sample and hold capacitors $C_S$ in the differential voltage circuit 54 (step 122). The voltage stored on the integration capacitor $C_{Int}$ is sampled by turning on the transistor $M_S$ using a gate signal SHS to complete the second sensing period. Timing of the reset and SHS signals during the second sensing period are illustrated in FIG. 4.

The difference between the voltage signals stored by the capacitors $C_R$ and $C_S$ is proportional to the infrared current signal $I_{sig}$, with the background signal reduced as much as several orders of magnitude. The voltage signals stored by the capacitors $C_R$ and $C_S$ can be read out to the buses 40, 38 (step 124) via the amplifiers 60, 62 and provided to the differential amplifier 64. The differential amplifier 64 provides an output signal corresponding to the difference between the voltage signals previously stored on the sample and hold capacitors (step 126). In other words, the output of the differential amplifier 64 is substantially proportional to the signal $I_{sig}$. The output can be sent to other circuitry (not shown) for further processing.

In the foregoing discussion, it was assumed that any background radiation to which the QWIP 44 was exposed was included in the dark level signal $I_{bak}$. If the detector 44 were exposed to an additional background radiation level during the first and second sensing periods beyond the exposure level during the calibration phase, then the respective voltages sampled and held by each of the sample and hold capacitors $C_R$, $C_S$ would be increased by an amount corresponding to the additional background radiation sensed by the detector. The differential value between the signals stored by the capacitors $C_R$ and $C_S$ would still be proportional to the signal $I_{sig}$.

The gate voltage ($\phi_{read}$) applied to the isolation transistor $M_{read}$ is DC-biased such that the current memory potential shuts off the isolation transistor during the calibration phase, whereas during the imaging phase, the source of the isolation transistor $M_{read}$ charges to a potential that allows the current to be injected onto the integration capacitor $C_{Int}$. Operating the circuit without pulsing the gate voltage $\phi_{read}$ can help prevent injection of switching noise into a sensitive circuit node.

To achieve a high conversion gain and low noise, a high injection efficiency should be maintained at the current memory circuit interface node 66. However, a large difference between the current flowing from the left of the node 66 to the right of that node can cause a decrease in the conductance at the source of the isolation transistor $M_{read}$, and, thus, a reduction in the injection efficiency. To maintain a high injection efficiency, two conditions should be satisfied. First, the effective conductance $g_{inj}$ looking into the left of the node 66 should be smaller than the combined conductance of the memory circuit output conductance $g_{CM}$ and the conductance $g_{read}$ at the source of the transistor $M_{read}$. In addition, $g_{CM}$ should be much smaller than $g_{mread}$ to ensure that the differential current is injected onto the source of the transistor $M_{read}$ and not into the memory circuit 52.

The total injection efficiency at the interface node 66 can be expressed as:

$$\eta_{inj} = \frac{g_{mread} \cdot (1 + A_1) \cdot A \cdot R_{det}}{1 + (g_{CM} + g_{mread}) \cdot (1 + A_1) \cdot A \cdot R_{det}}$$

where A is the gain of the BDI operational amplifier 56, $A_1$ is the intrinsic gain of the injection FET $M_{inj}$, and $R_{det}$ is the resistance of the detector 44. The readout circuit 46 should be designed so that the memory circuit output conductance $g_{CM}$ is kept small, while the open loop gain A of the BDI operational amplifier 56 can be chosen to be sufficiently high to reduce the value of $g_{inj}$ and provide a high total injection efficiency $\eta_{inj}$. Assuming that the infrared signal of interest ($I_{sig}$) is about three orders of magnitude below the background signal ($I_{bak}$), an operational amplifier gain of about 300 can be used to achieve an injection efficiency greater than 0.99.

The array 36 of readout circuits 46 can be implemented using a 1.2 μm single polysilicon, double metal CMOS process with a unit cell size of about 50 μm×400 μm. In one particular implementation, the voltage swing of the clock signals $\phi_1$ and $\phi_2$ is from 0 to 5 volts, the DC bias $\phi_{read}$ on the gate of the isolation transistor $M_{read}$ is in the range of 0 to 1.0 volt, and the bias $V_{bn}$ on the gate of the transistor $M_1$ is 1.5 volts. Other techniques and values can be used in different implementations.

In the foregoing discussion, there is a one-to-one correspondence between each readout circuit in the array 36 and one of the detectors 44 in the array 32. More generally, however, output signals from multiple detectors can be multiplexed into one readout circuit to reduce the number of readout circuits in the array 32.

Other implementations are within the scope of the following claims.

What is claimed is:

1. A circuit for reading out a signal from an infrared detector, the circuit comprising:

a current-mode background-signal subtracting circuit having a current memory which can be enabled to sample and store a dark level signal from the infrared detector during a calibration phase, and wherein the signal stored by the current memory is subtracted from a signal received from the infrared detector during an imaging phase.

2. The circuit of claim 1 wherein the current memory includes a plurality of capacitively-coupled current loops.

3. The circuit of claim 2 wherein the current memory includes a plurality of capacitive elements arranged to reduce a switch feedthrough voltage.

4. The circuit of claim 1 wherein the current memory includes means for reducing a switch feedthrough voltage.

5. The circuit of claim 1 wherein the readout circuit further includes:

a buffered direct injection input circuit coupled between the detector and the current-mode background-signal subtracting circuit.

6. The circuit of claim 1 wherein the readout circuit further includes:

a differential voltage readout section.

7. The circuit of claim 6 wherein the readout circuit further includes an integration capacitor for converting a current signal to a corresponding voltage signal that is to be stored in the differential voltage readout section.

8. The circuit of claim 7 wherein the integration capacitor can be reset.

9. The circuit of claim 6 wherein the differential voltage readout section includes a pair of sample and hold circuits.

10. A circuit for reading out a signal from an infrared detector, the circuit comprising:

a current-mode background-signal subtracting circuit having a current memory which can be enabled to sample and store a dark level signal based on a signal from the infrared detector during a calibration phase, and wherein the signal stored by the current memory is subtracted from a signal received from the infrared detector during an imaging phase;

a buffered direct injection input circuit coupled between the detector and the current-mode background-signal subtracting circuit; and a differential voltage readout section.

11. An infrared imager comprising:

an infrared detector;

a readout circuit coupled to the detector to provide an electrical signal corresponding to signals sensed by the detector, wherein the readout circuit includes:

a current-mode background-signal subtracting circuit having a current memory which can be enabled to sample and store a dark level signal from the detector during a calibration phase, and wherein the signal stored by the current memory is subtracted from a signal received from the detector during an imaging phase.

12. The imager of claim 11 wherein the readout circuit further includes:

a differential voltage readout section.

13. The imager of claim 12 wherein the readout circuit further includes:

a buffered direct injection input circuit coupled between the detector and the current-mode background-signal subtracting circuit.

14. The imager of claim 11 wherein the current memory includes means for reducing a switch feedthrough voltage.

15. The imager of claim 11 wherein the detector is sensitive to radiation in a range of about 12–18 microns.

16. The imager of claim 11 wherein the detector is a quantum well infrared photodetector.

17. An infrared imager comprising:

an array of infrared detectors;

an array of readout circuits coupled to the array of detectors to provide electrical signals corresponding to signals sensed by the detectors, wherein each readout circuit includes:

a current-mode background-signal subtracting circuit having a current memory which can be enabled to sample and store a dark level signal from a detector in the array during a calibration phase, and wherein the signal stored by the current memory is subtracted from a signal received from the same detector during an imaging phase.

18. The imager of claim 17 wherein the current memory includes a plurality of capacitively-coupled current loops.

19. The imager of claim 18 wherein the current memory includes a plurality of capacitive elements arranged to reduce a switch feedthrough voltage.

20. The imager of claim 17 wherein the current memory includes means for reducing a switch feedthrough voltage.

21. The imager of claim 17 wherein each readout circuit further includes:

a buffered direct injection input circuit coupled between a corresponding detector in the array and the current-mode background-signal subtracting circuit.

22. The imager of claim 17 wherein each readout circuit further includes:

a differential voltage readout section.

23. The imager of claim 22 wherein each readout circuit further includes an integration capacitor for converting a current signal to a corresponding voltage signal that is to be stored in the differential voltage readout section.

24. The imager of claim 23 wherein the integration capacitor can be reset.

25. The imager of claim 22 wherein the differential voltage readout section includes a pair of sample and hold circuits.

26. The imager of claim 17 wherein the array of detectors includes detectors that are sensitive to radiation in a range of about 12–18 microns.

27. The imager of claim 17 wherein the array of detectors includes quantum well infrared photodetectors.

28. A method of reading out signals sensed by an infrared detector, the method comprising:

storing a dark level signal received from the infrared detector in a current memory circuit during a calibration phase;

subtracting the signal stored in the current memory circuit from a current signal received from the infrared detector during an imaging phase; and providing an output voltage signal corresponding to the difference between the signal stored in the current memory circuit and the signal received from the detector during the imaging phase.

29. A method of reading out signals sensed by an infrared detector, the method comprising:

storing a dark level signal received from the infrared detector in a current memory circuit during a calibration phase;

providing a first current signal that represents the difference between the signal stored in the current memory circuit and a signal received from the infrared detector during a first sensing period;

providing a second current signal that represents the difference between the signal stored in the current memory circuit and a signal received from the infrared detector during a second sensing period;

providing a differential voltage output signal corresponding to a difference between the first and second current signals.

30. The method of claim 29 including exposing the detector to infrared radiation during the second sensing period.

31. The method of claim 30 wherein the detector is exposed to radiation in a range of about 12–18 microns during the second sensing period.

32. The method of claim 31 wherein the act of converting includes:

integrating current signals on an integration capacitor;

sampling voltages on the integration capacitor; and holding the sampled voltages on first and second capacitors, respectively.

33. The method of claim 32 including:

resetting the integration capacitor.

34. The method of claim 29 including:

converting the first and second current signals, respectively, to first and second voltage signals.

35. The method of claim 29 including:

reducing a switch feedthrough voltage in the current memory circuit.

* * * * *